(No Model.)
A. H. MAHAFFIE & P. KESLING.
CORNSTALK CUTTER.
No. 430,664. Patented June 24, 1890.
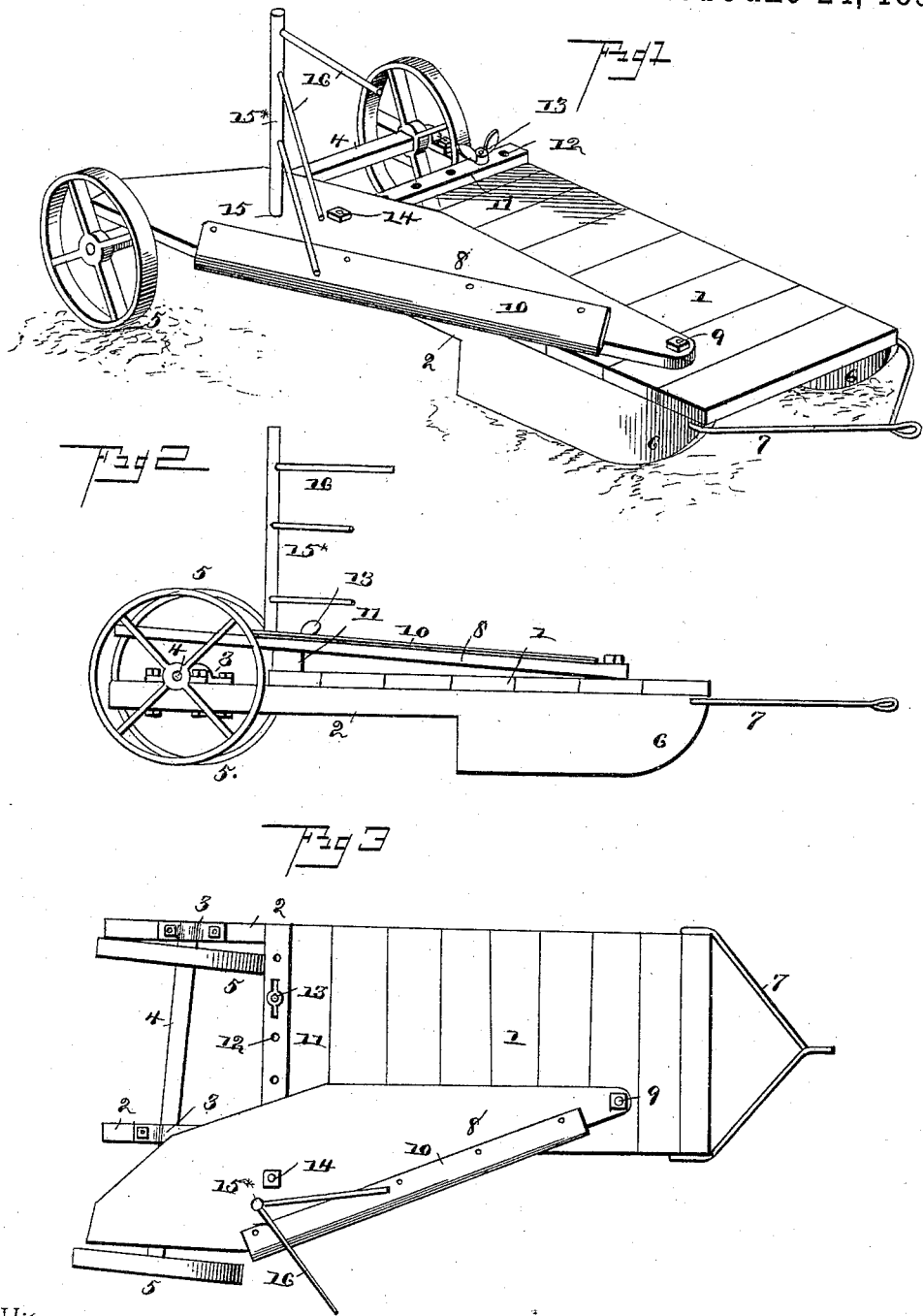
Witnesses:
John Imirie
W. S. Duvall
Inventor
Andrew H. Mahaffie
Perry Kesling
By their Attorneys,
C. A. Snow & Co.

UNITED STATES PATENT OFFICE.

ANDREW H. MAHAFFIE AND PERRY KESLING, OF LOGANSPORT, INDIANA.

CORNSTALK-CUTTER.

SPECIFICATION forming part of Letters Patent No. 430,664, dated June 24, 1890.

Application filed September 18, 1889. Serial No. 324,343. (No model.)

*To all whom it may concern:*

Be it known that we, ANDREW H. MAHAFFIE and PERRY KESLING, citizens of the United States, residing at Logansport, in the county of Cass and State of Indiana, have invented a new and useful Cornstalk-Cutter, of which the following is a specification.

This invention has relation to stalk-cutters, and has for its object the provision of a stalk-cutter having a tendency to ride close to the line of stalks, and which will sever the same positively and with a shear-like cut, and which is adjustable for cutting swaths of varying widths, and to construct the apparatus in a cheap and simple manner, all as will hereinafter appear, and be particularly pointed out in the claims.

Referring to the drawings, Figure 1 is a perspective of a stalk-cutter constructed in accordance with our invention; Fig. 2, a side elevation; Fig. 3, a plan.

Like numerals of reference indicate like parts in all the figures of the drawings.

In practice we mount the platform 1 upon suitable side bars 2, the rear ends of which extend beyond the end of the platform. On the side bars, in bearings 3, is journaled an axle 4, carrying ground-wheels 5, the wheel on the cutter side being preferably arranged outside of the side bar and the opposite wheel upon the inside.

For a reason hereinafter apparent the axis or shaft carrying the wheels is not arranged at an exact right angle to the longitudinal length of the platform, but obliquely, so that there is a constant tendency for the truck to travel to one side, which will of course be the cutting side of the machine. The forward ends of the side bars 2 are provided with runners 6, which are in longitudinal line with said side bars and are provided at their forward ends with an ordinary draft-bail 7.

8 represents the cutter-bar, which is pivoted by a bolt 9 to the platform 1, near its forward end. At one side of and upon said bar is mounted the cutting-blade 10, which is rigid and stationary upon the bar.

11 represents the cutter-bar-adjusting rod, which is provided with a series of bolt-holes 12 and extends at a right angle from and is bolted by bolts 13 to the platform. By means of the series of bolt-holes said adjusting-rod may be set so as to project farther from or nearer to said platform. The end of the rod is pivoted by a bolt 14 to the cutter-bar, and by an adjustment of the rod it is apparent that said cutter-bar and its knife will be presented at a greater or less angle to the stalks. By reason of said adjusting-rod being located upon the upper surface of the platform, it is apparent that the cutter-bar and its knife will be inclined from rear to front, so that a downward as well as a lateral shear-like cut will be given the stalks.

An opening 15 is formed in the cutter-bar, and in the same is stepped a post $15^\times$, from which forwardly diverge guide-arms 16, which gather and serve to concentrate or condense the stalks and force them against the cutter for its action.

From the above description it will be apparent that we have provided a stalk-cutter having a tendency to always press against the stalks, and which will sever said stalks in a shear-like manner by reason of the disposition of its knife, and which may be adjusted to cut swaths of varying widths.

In operation it will be apparent that one or more attendants stand upon the platform and gather the stalks as they are severed, and either cast the same to the rear upon the platform or shock the same.

Having described our invention, what we claim is—

1. In a stalk-cutter, the combination, with a platform and a rearwardly-disposed cutter-bar projecting outwardly beyond the edge of the platform, of an axle obliquely journaled in the frame-work of the same, and provided with ground-wheels, substantially as specified.

2. In a stalk-cutter, the combination, with the opposite side bars having a platform mounted thereon and a rearwardly-disposed cutter secured at its front end to the platform and extending beyond one side of the platform, of a supporting-axle mounted obliquely across the rear ends of the bars and provided with ground-wheels, said axle being disposed in the same direction, but at an angle to the cutter, and runners at the forward ends of said bars, substantially as specified.

3. In a stalk-cutter, the combination, with a platform and side bars, of runners arranged parallel with and connected to the side bars, and a rearwardly-inclined cutter extending from one side of the platform near its forward end, and an obliquely-journaled axle mounted in the rear ends of the bars and provided with ground-wheels, substantially as specified.

4. In a stalk-cutter, a platform and side bars projecting to the rear thereof, and a rearwardly-inclined cutter-bar projecting from one side of the platform, in combination with the runners secured to the forward ends of the side bars and an axle obliquely journaled in the rear ends of said side bars and provided with ground-wheels, one of which is arranged upon the outside of one of the bars and the other intermediate the two bars, substantially as specified.

5. In a stalk-cutter, the combination, with the platform, of a cutter-bar pivoted at its forward end directly to the forward end of the platform and an adjusting-bar adjustably connected to the upper surface of the platform and terminating under and pivotally connected with the rear end of the cutter-bar, whereby the rear end of the cutter is elevated above its forward end the thickness of the adjusting-bar and given a forwardly downwardly-inclined disposition, substantially as specified.

6. In a stalk-cutter, the combination, with the platform, opposite side-supporting bars projecting beyond the same at its rear end, an axle obliquely journaled in the ends of the bar and provided with ground-wheels, the wheel upon the cutter side being arranged outside of the side bar and that upon the opposite side between the side bars, and runners provided at the outer ends of the bars, a cutter-bar pivoted upon the upper surface and forward end of the platform and carrying a fixed knife, and an adjusting-bar mounted on the platform and provided with a set-bolt, and terminating under and pivotally connected to the rear end of the cutter-bar, substantially as specified.

In testimony that we claim the foregoing as our own we have hereto affixed our signatures in presence of two witnesses.

ANDREW H. MAHAFFIE.
PERRY KESLING.

Witnesses:
WILLIAM POWELL, Sr.,
JOHN W. McGUERY.